Sept. 17, 1963 LE ROY F. CARKHUFF 3,104,029
ARTICLE DENESTING AND DISPENSING APPARATUS
Filed Dec. 13, 1961 7 Sheets-Sheet 1
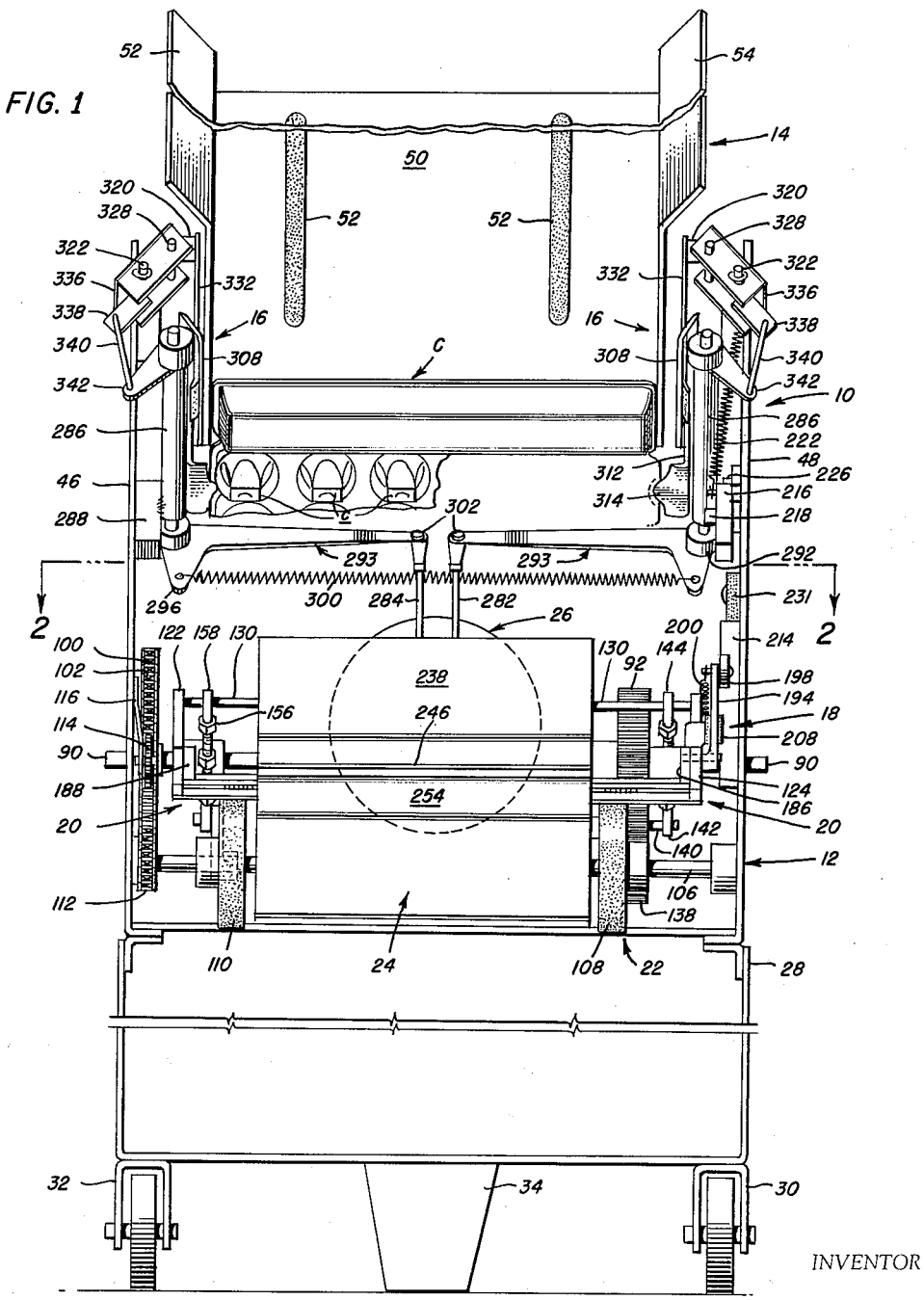
INVENTOR
LeRoy Carkhuff
BY Karl W. Flocks
ATTORNEY

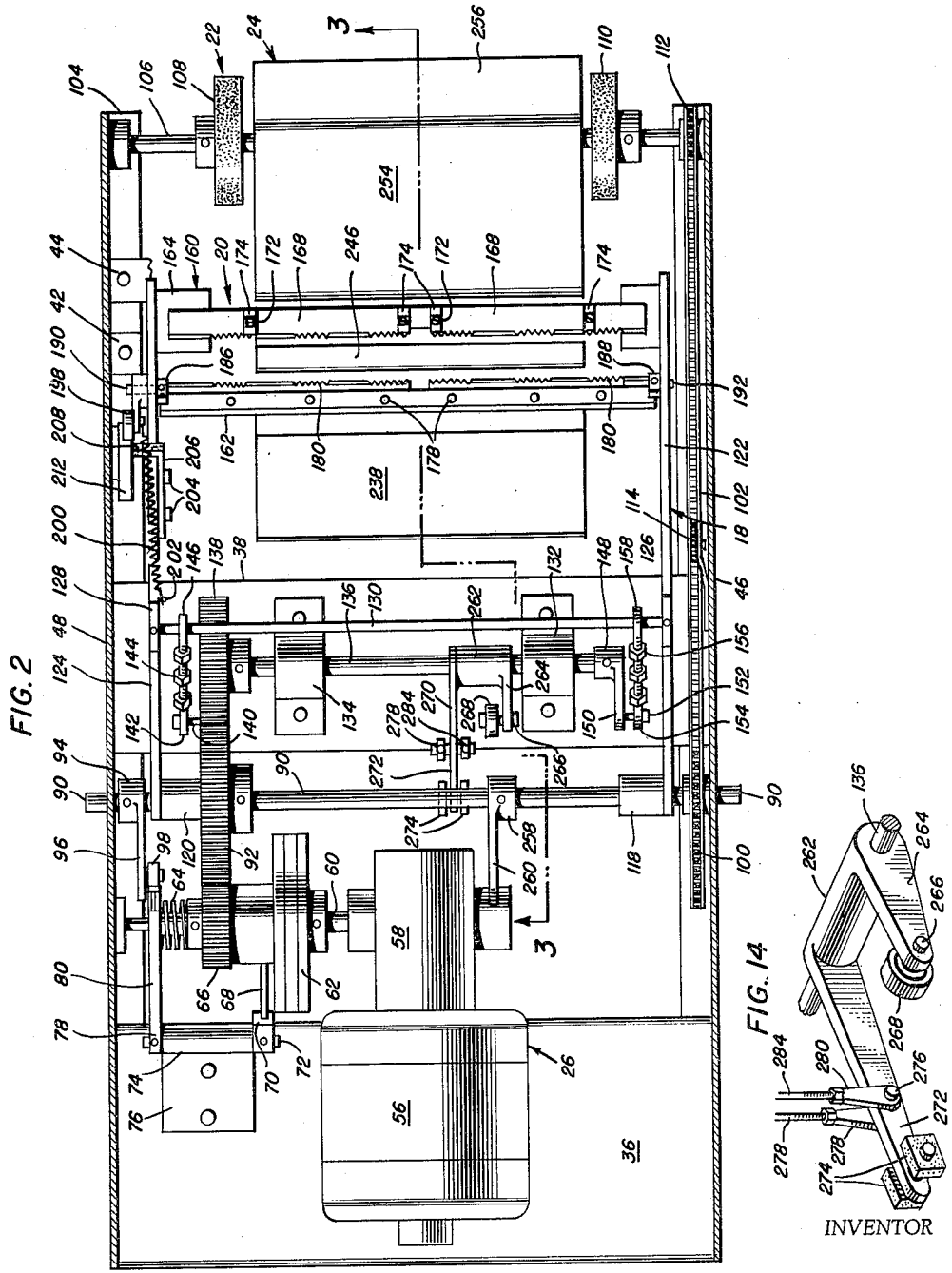

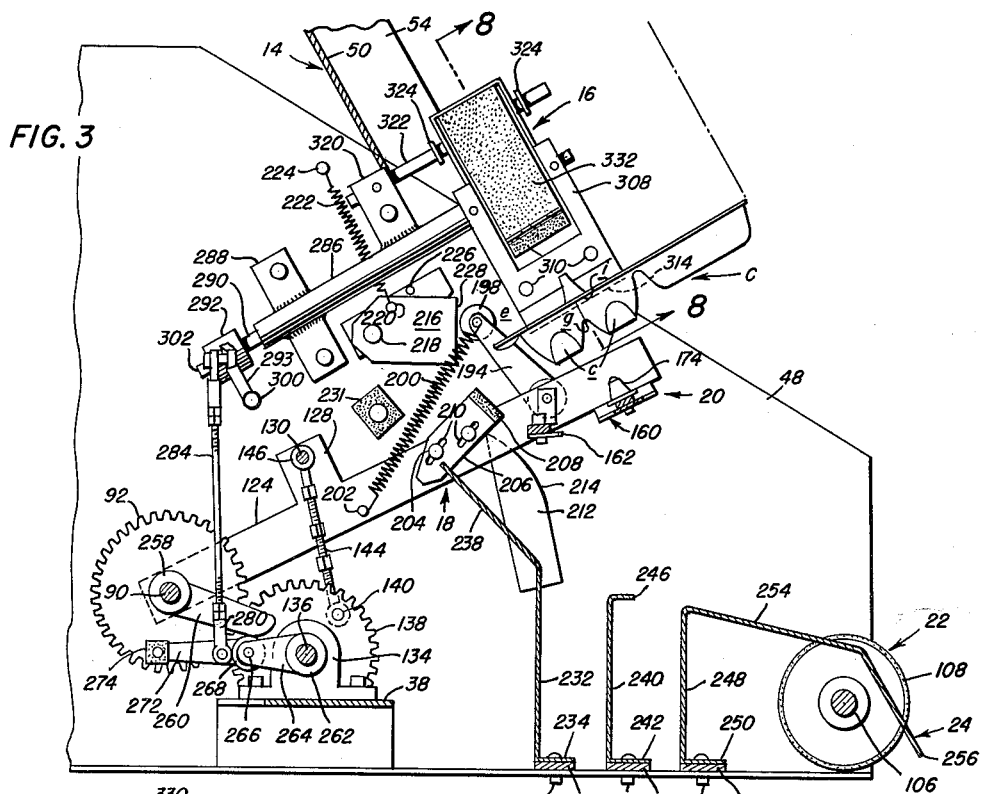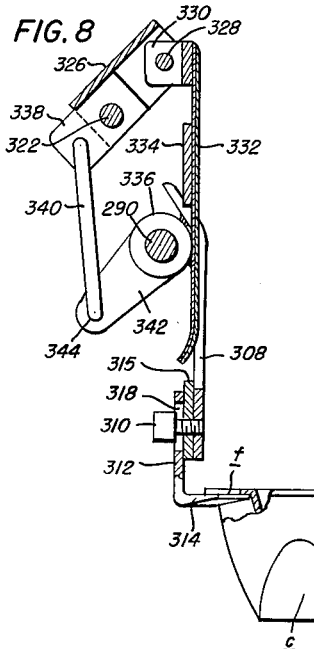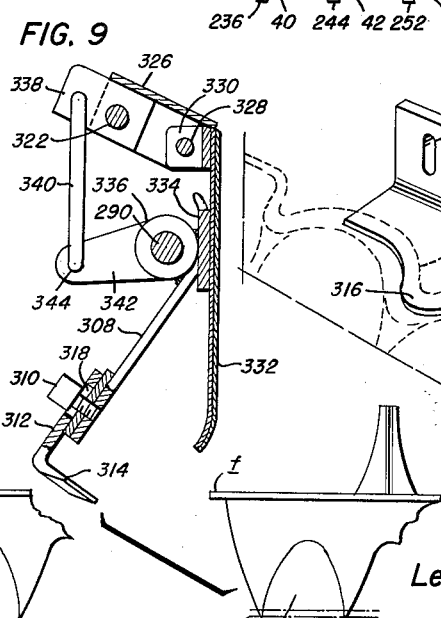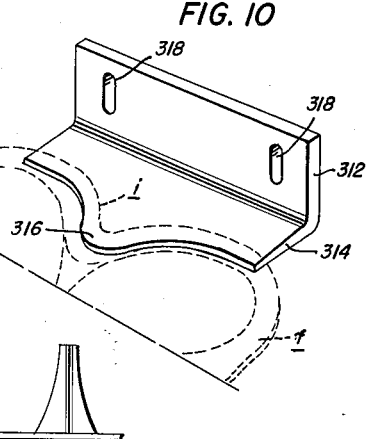
Sept. 17, 1963 LE ROY F. CARKHUFF 3,104,029
ARTICLE DENESTING AND DISPENSING APPARATUS
Filed Dec. 13, 1961 7 Sheets-Sheet 3
INVENTOR
LeRoy Carkhuff
BY
KARL W. FLOCKS
ATTORNEY Sept. 17, 1963         LE ROY F. CARKHUFF                3,104,029
              ARTICLE DENESTING AND DISPENSING APPARATUS
Filed Dec. 13, 1961                                7 Sheets-Sheet 4
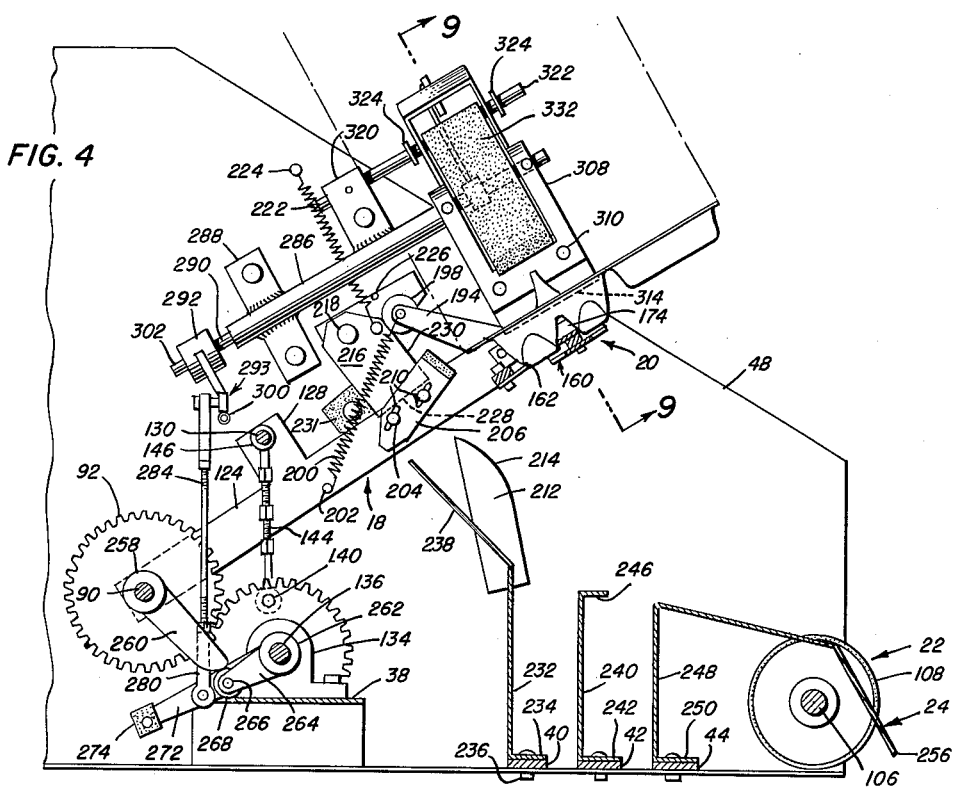
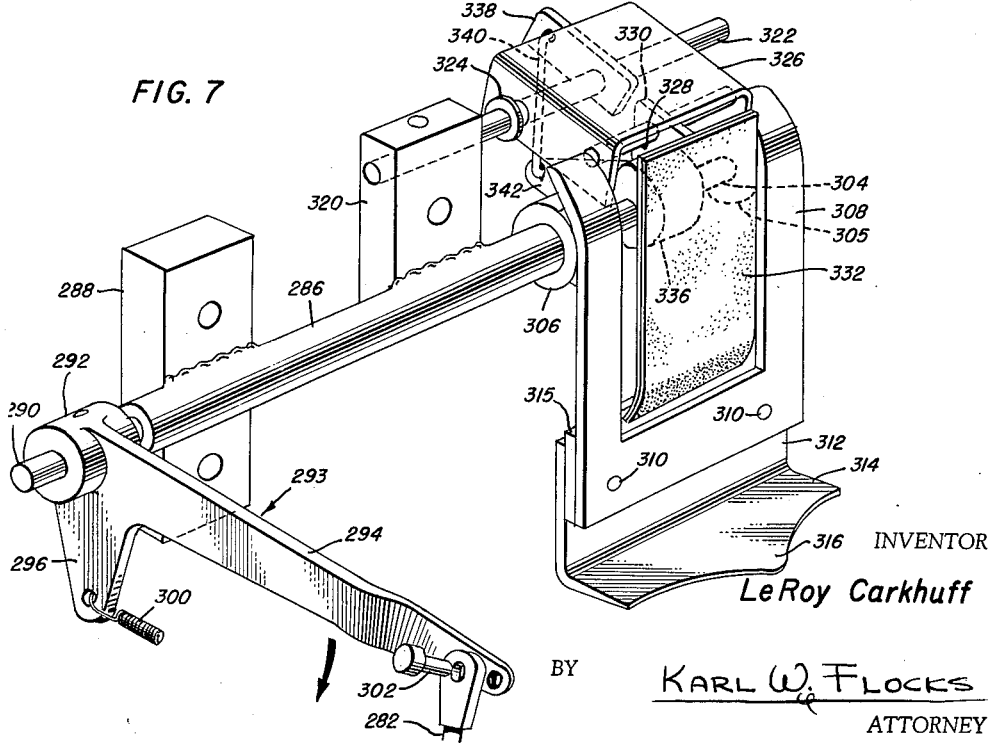
INVENTOR
LeRoy Carkhuff
BY   KARL W. FLOCKS
                    ATTORNEY INVENTOR
LeRoy Carkhuff
BY
Karl W. Flocks
ATTORNEY Sept. 17, 1963    LE ROY F. CARKHUFF    3,104,029
ARTICLE DENESTING AND DISPENSING APPARATUS
Filed Dec. 13, 1961    7 Sheets-Sheet 7

INVENTOR
LeRoy Carkhuff

BY    KARL W. FLOCKS
ATTORNEY

United States Patent Office 3,104,029
Patented Sept. 17, 1963

3,104,029
ARTICLE DENESTING AND DISPENSING
APPARATUS
LeRoy F. Carkhuff, Morris, Ill., assignor to Diamond National Corporation, New York, N.Y., a corporation of Delaware
Filed Dec. 13, 1961, Ser. No. 159,097
11 Claims. (Cl. 221—236)

This invention relates generally to dispensing apparatus and more particularly to apparatus particularly adapted for denesting or removing a lowermost article from a vertical stack of nested articles, such as egg cartons or the like, from a hopper or chute.

With the advent of automation, particularly in the packing art, cartons, such as egg cartons or the like, must be automatically dispensed through automatic packing equipment; see, for example, United States Letters Patent to Mumma No. 2,895,274. Folded paperboard cartons are preferred by certain packers for various reasons; however, others prefer molded pulp nested cartons. Nested molded pulp egg cartons generally include a relatively rough inner surface which, although providing a good cushioning surface for the eggs that are packed therein, frictionally resists separation of nested cartons.

A primary object of the present invention is to provide novel dispensing or denesting apparatus for readily and positively dispensing articles one-by-one from a vertical gravity supported stack of such articles.

Another object of the present invention is to provide, in denesting apparatus of the character involved, vertically movable article transport means movable from a carton-receiving position at the lower end of the vertical path of travel of a stack of nested cartons in chute means, and to a release position for dispensing the carton for use in manual or automated packing systems or the like.

Other objects and the nature and advantages of the subject inevntion will become apparent from the following description taken in conjunction with the accompanying drawings, wherein:

FIG. 1 is a front elevation of the novel denester or dispensing apparatus with portions broken away for purposes of clarity;

FIG. 2 is a horizontal section taken substantially on the plane of line 2—2 of FIG. 1;

FIG. 3 is a vertical section taken substantially on the plane of line 3—3 of FIG. 2, showing the transport assembly and gripper means thereof adjacent the lower end of the chute means just before the lowermost article in the chute means is engaged by the gripping means;

FIG. 4 is a view, similar to FIG. 3, showing the gripping means engaged on the lowermost carton in the chute means;

FIG. 7 is an enlarged fragmentary perspective view of one of the displaceable support assemblies disposed at opposite sides of the lower end of the chute means;

FIG. 8 is an enlarged vertical section taken substantially on the plane of line 8—8 of FIGS. 3 and 5, showing the manner in which the nested stack of articles is supported in the chute means of the apparatus prior to and after the lowermost carton is removed from the stack;

FIG. 9 is an enlarged vertical section, similar to FIG. 8, and taken substantially on the plane of line 9—9 of FIG. 4, and showing the manner in which the support lip elements of the carton support mechanism is disposed when the gripping means of the apparatus engages the lowermost carton of a nested stack;

FIG. 10 is an enlarged perspective view of one of the support lip elements of the mechanism disclosed in FIGS. 7–9;

FIG. 14 is an enlarged perspective view of the mounting bracket for the control mechanism of the displaceable carton support lip means;

Figure 5:
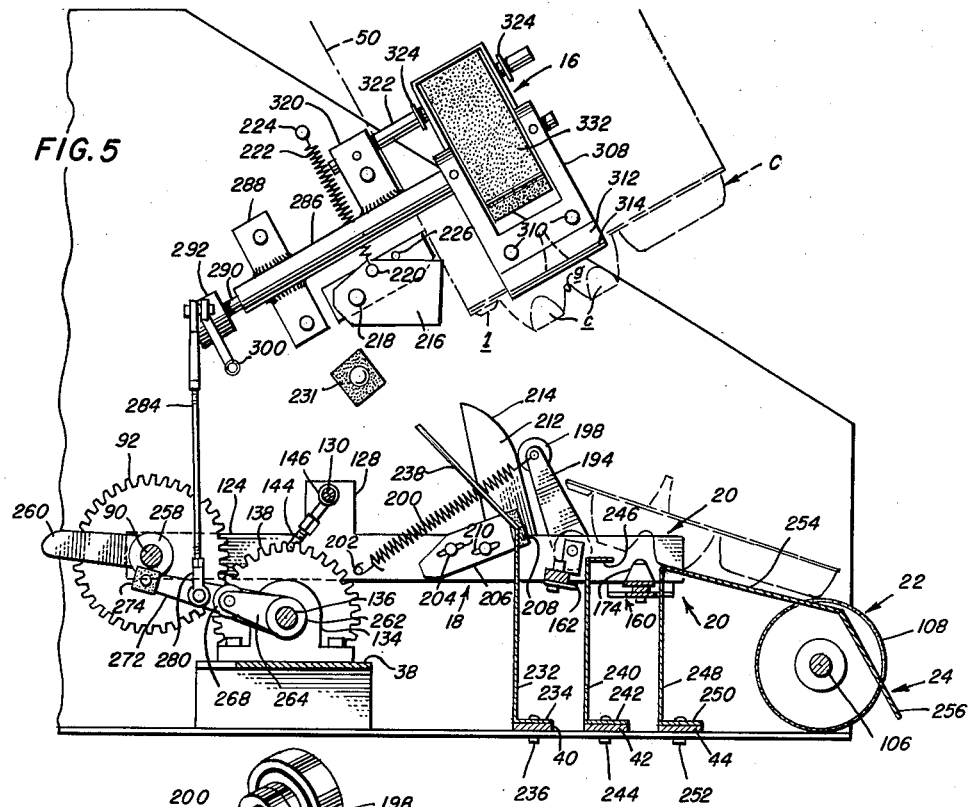
FIG. 5 is a view similar to FIGS. 3 and 4, showing the transport assembly approaching its lowermost position wherein the lowermost carton removed from the chute means is stripped from the gripping means to be conveyed away from the apparatus.

Referring to the drawings in detail, and first considering FIGS. 1 and 2, the novel denester or dispensing apparatus is indicated generally at 10 and comprises a support frame member 12 including vertically extending, inclined chute means 14 having at the lower end thereof opposed article support assemblies 16 which are mirror images of each other. Supported in the frame member 12 is an article transport assembly 18 including article gripping means 20, and article conveying means 22 cooperating with article stripping means 24. Disposed in the rear portion of the support frame member 12 is suitable power means 26 for providing the necessary diving force to the various components of the apparatus.

Briefly describing the function of the apparatus in the absence of specific structural details, a stack of nested articles, such as molded pulp egg cartons, which are difficult to separate, are disposed in the inclined chute means 14 and are supported by the assemblies 16 a substantial distance above the separator means 24 and conveying means 22. The assembly 16 will positively orient the lowermost article of a nested stack in relation to vertical movement of the transport assembly 18 which is driven by the power means 26, and the gripping jaw means will be controlled to snap into engagement with the lowermost article of the nested stack when adjacent the lower portion of the chute means 14 and will subsequently be opened when disposed adjacent the stripper means 24 for removal of the article by the conveyor means 22.

The support frame 12 includes a lower support portion 28 which, if preferred, may have depending wheel assemblies 30 and 32 at the forward corners thereof and a rear depending support stand 34. Extending horizontally from opposite sides of the support frame member 12 and intermediately thereof is a rear support plate 36, intermediate support plate 38, and forward support straps or plates 40, 42, and 44, see FIGS. 2 and 3, for example.

The support frame member 12 includes a pair of vertically extending, mutually parallel and substantially triagular support side walls or plates 46 and 48 which have extending vertically therebetween and terminating at an intermediate portion thereof the vertically extending and rearwardly inclined chute means 14. The chute means 14 is suitably supported between the side plates 46 and 48 and comprises a back plate member 50 which, if preferred, will have elongated strips of friction increasing material 52 fixed thereon, and includes a pair of forwardly extending side plates 52 and 54 between which the end portions of a stack of nested articles will be guidingly disposed.

Cartons of the character especially adapted for use on denesting or dispensing apparatus of the character involved herein are those described in detail in United States Letters Patent to Reifers No. 2,990,094 issued June 27, 1961. Additionally, cartons which incorporate relatively elongated vertically extending posts for engaging the undersurface of a carton lid are also adapted for use on the subject apparatus. In these latter cartons, the relatively elongated narrow posts have a tendency to firmly nest and thus positive force is needed to separate adjacent nested cartons C. The egg cartons of the character involved and disclosed in this exemplary embodiment are usually identified as "2 x 6" wherein the cartons include two rows of six adjacent cells formed by depending cell forming structure, as indicated at $c$ in FIGS. 1, 3 and 9–10, for example, the cells being bordered by a peripheral flange $f$ including an intermediate indentation $i$. The adjacent rows of cells, as seen in FIG. 3, for example, have extending inwardly therebetween a groove $g$ for accommodating orienting structure of the gripping means 22, as will subsequently be described in detail.

Figure 11:
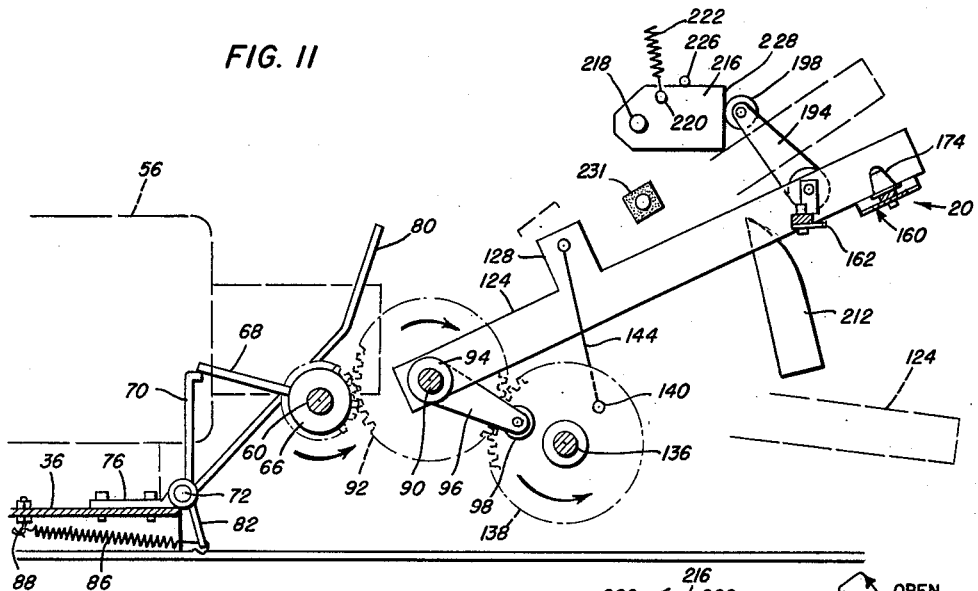
FIG. 11 is a diagrammatic side elevation illustrating the manner in which the transport assembly and gripping means are moved with respect to control cam elements for the displaceable jaw of the gripping means.
Figure 12:
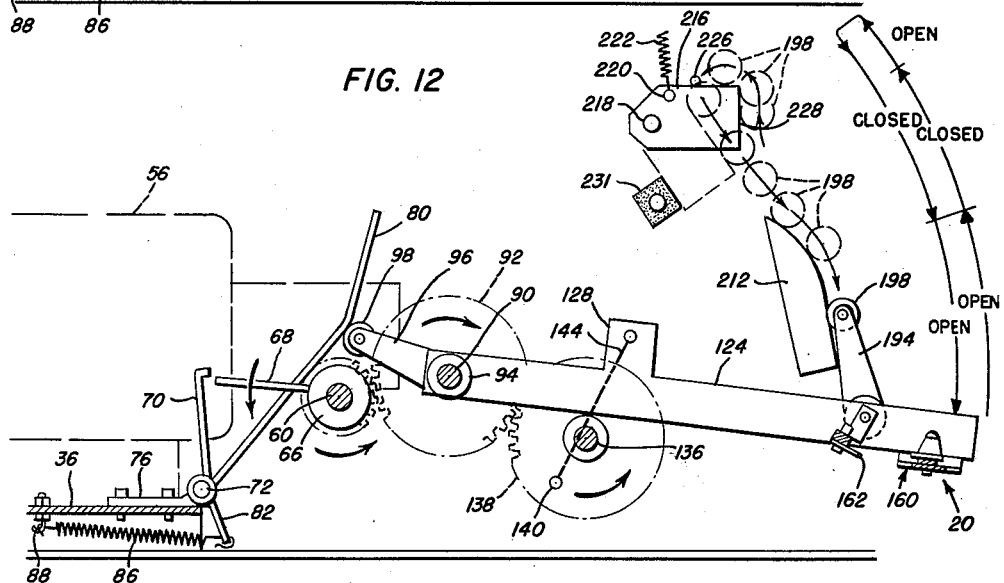
FIG. 12 is a view similar to FIG. 11 illustrating the manner in which the displaceable jaw is opened at its lowermost position for release of a carton engaged thereby and moved to a position to be conveyed away from the apparatus, and illustrating graphically the condition of the displaceable jaw during a cycle of movement of the article transport and the gripping means.
Figure 13:
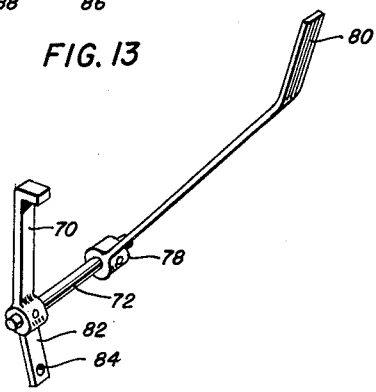
FIG. 13 is an enlarged perspective view of the control lever controlling a cycle of engagement of the clutch mechanism utilized in the power means of the apparatus.

Referring to the power means 26 and FIG. 2, the support plate 36 has mounted thereon an electric motor 56 having a forwardly extending transmission 58 connected by a laterally extending power-output shaft 60 to a clutch mechanism 62 which will not be described in detail. The clutch mechanism is urged toward engagement by a compression spring 64 and includes a drive spur gear 66. Projecting rearwardly is an operating lever 68 which will engage upon a rearwardly displaceable stop-lever 70 projecting vertically from a support shaft 72 journaled on a transverse sleeve 74 mounted on a support bracket 76 mounted on the plate 36. The other end 78 of the shaft 72 has fixed thereto an upwardly extending lever 80 which may be manually or mechanically displaced rearwardly for the purpose of causing operation of the clutch mechanism 62 and counterclockwise rotation of the spur gear 66, as indicated diagrammatically in FIGS. 11 and 12. As seen in FIGS. 11–13, the lower end of the lever 70 as indicated at 82 is connected at 84 to a tension spring 86 anchored at 88 to a rear undersurface portion of the support plate 36. When the lever 70 is moved out of the path of travel of the actuating lever 68 of the clutch mechanism 62, as shown in FIG. 12, the drive gear 66 will make two complete revolutions and permit the article transport assembly to move through one complete cycle of upward and downward movement, as illustrated in FIG. 12 and as will subsequently be described in detail below. The lever 80, in addition to being operated manually, may be operated by means of a suitable solenoid control or the like (not shown), for the purpose of accommodating the denesting or dispensing apparatus in automation systems.

Extending transversely between the side plates 46 and 48 and journaled therein at opposite ends is a drive shaft 90 which includes thereon a driven spur gear 92 meshingly engaged with the driving spur gear 66. Fixed on the shaft 90, adjacent the inner surface of the side plate 48, is a mounting hub 94 of a radially extending lever 96 including an abutment wheel 98 thereon. As the shaft 90 is caused to rotate in a clockwise direction, as indicated in FIGS. 11 and 12, the abutment roller 98 will engage the undersurface of the lever 80 for maintaining the lever 70 out of engagement with the actuating lever 68 of the clutch mechanism 62. Thus, the driving gear 66 will be caused to have 720° of rotation for each one single revolution of the driven gear 92 to afford one cycle of movement to the article transport assembly 20, as indicated diagrammatically in FIG. 12.

Fixed on the drive shaft 90, inwardly of the inner surface of support plate 46, is a drive sprocket 100 which has entrained thereabout an endless link chain 102. Journaled transversely between the support plates 46 and 48, at the forward end 104 of the support frame 12, is a transverse support shaft 106 which has fixed thereon spaced friction wheels 108 and 110 comprising the conveyor means 22 of the apparatus. The wheels 108 and 110 will have a friction increasing material on the outer peripheral surface for engaging the outer surface of the lid of a carton C, see FIG. 5, for rapidly moving the carton away from the stripping means 24. The shaft 106 has secured thereon, inwardly of the inner surface of the plate 46, a driven sprocket 112 having about a 1:4 tooth ratio with respect to the driving sprocket 100 and the link chain 102 is entrained thereover.

As seen in FIG. 1, a suitable idler wheel 114 may be fixed by a mounting strap 116 on the inner surface of the support plate 46 for maintaining the proper tension in the drive chain 102. As the wheel 100 is roatated with the drive shaft 90, the shaft 106 will rotate at an appreciably greater speed to afford ready removal of the segregated articles or cartons from the stripper mechanism 24, as will subsequently be described in detail.

On the drive shaft 90, which defines the pivot axis for the vertically movable or oscillatory article transport assembly 18, are bearing sleeves 118 and 120 of forwardly extending, flat support arms 122 and 124, respectively. The arms 122 and 124 include intermediate vertically extending plate portions 126 and 128 to which is secured a transversely disposed spacing rod 130. As seen in FIG. 2, the rod 130 is disposed above the transverse support plate 38 extending between the side plates 46 and 48. Secured to the upper surface of the support plate 38 are a pair of spaced bearing brackets 132 and 134 which have journaled therein a support or timing shaft 136 parallel to the drive shaft 90. Fixed to one end of the shaft 136, in meshed engagement with the driven gear 92, is a spur gear 138 which will afford counterclockwise rotation of the shaft 130 as the gear 92 is rotated by the driving gear 66 when driven through the clutch mechanism 62.

Extending laterally from the outer surface of the gear 138 is a radially disposed pivot pin 140 upon which is journaled the lower end 142 of an adjustable connecting link 144, the other end of the link being journaled on the previously described shaft 130, as indicated at 146. Fixed to the other end of the shaft 136 by a hub or sleeve 148 is a radially extending lever 150 having extending laterally therefrom a pivot pin 152 disposed in coaxial relation with the pivot pin 140. The pivot pin 152 has journaled thereon one end 154 of a second adjustable connecting link 156 journaled at its other end at 158 on the rod 130.

As the gears 66, 92 and 138 are simultaneously rotated, it being noted that the gears 92 and 138 have a 1:1 tooth ratio, the article transport assembly 18 with the article gripping means 20 will be oscillated about the pivot axis defined by the shaft 90 through the positions illustrated in FIGS. 3–5 and 11 and 12. The oscillatory movement will carry the gripping means 20 to a position immediately beneath the opposed article support assemblies 16 at the lower portion of the chute means 14 which defines a vertical path of travel for the nested stack of cartons C. Additionally, the assembly 20 will move in its vertical path of travel below the stripper means 24; see FIG. 5, for the purpose of disposing a segregated carton on the stripping means structure for engagement by the conveying means wheels 108, previously mentioned.

Figure 6:
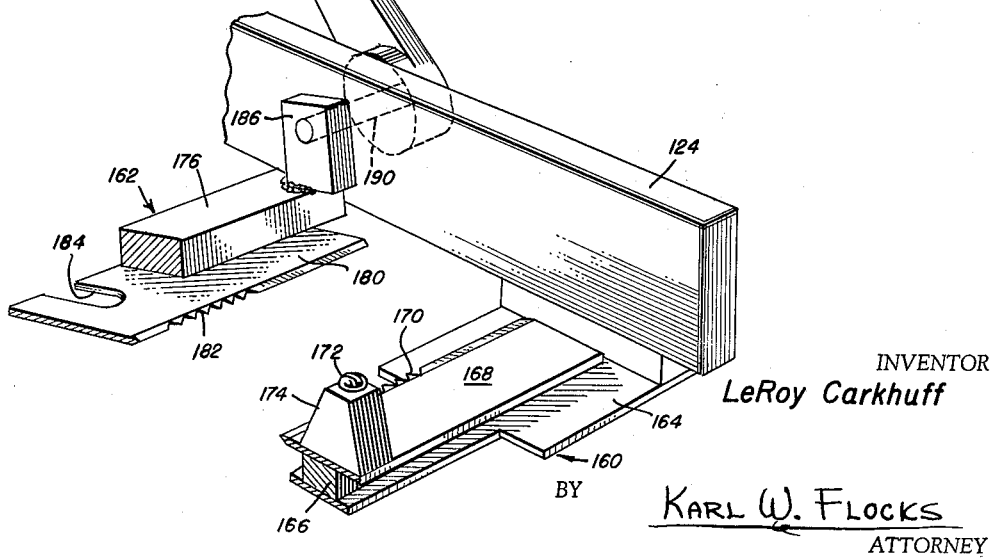
FIG. 6 is an enlarged perspective view of a fragmentary portion of the gripping means of the transport assembly.

The gripping means 20 includes a fixed gripping bar or jaw 160 and a displaceable or oscillatory jaw 162, each of the jaws extending transversely in spaced relationship between the inner surface portions of the support arms 122 and 124, as seen in FIGS. 2 and 6. The fixed jaw 160 comprises a transverse support plate 164 suitably secured on opposed under edge portions of the support arms 122 and 124 adjacent the terminal ends of the support arms. Fixed to the upper surface of the support plate 164 in suitably threaded apertures therein are spacer shims 166 which extend the length of the support plate 164 and which have mounted thereon relatively thin gripper blades 168 which have rearwardly facing, serrated or sharpened tooth portions 170. The blades 168 are retained on the spacer shims 166 by means of machine screws 172 which extend vertically through vertically extending, triangular-shaped block elements 174 which generally conform to the groove portion g between adjacent rows of cells c of the lowermost carton C disposed in the chute means, see, for example, FIGS. 3 and 4. When the triangularly shaped elements 174 are disposed in the groove g, the teeth 170 of the blades 168 will be disposed slightly above the lower surface of the cells c located adjacent the lock flap l of a carton C; see FIG. 9, for example.

The displaceable or oscillatory gripping jaw 162 includes a transversely disposed support bar 176 having fixed to the undersurface thereof, by means of nut and bolt assemblies 178, transversely extending gripping blades 180 which include at their forward edge serrated tooth portions 182 opposed to the teeth 170 of the blades 168. The blades 180 have extending therethrough transverse slot portions 184 through which the bolts of the nut and bolt assemblies 178 extend, for permitting the blades 180 to be adjusted toward and away from the blades 168 for accommodating different cell widths therebetween. The support bar 176 includes upwardly extending support ear elements 186 and 188 which have extending laterally and outwardly therefrom trunnion or pivot pin elements 190 and 192, respectively. The trunnion or pivot pin elements 190 and 192 are respectively journaled in suitable aperture portions of the support arms 122 and 124, as most clearly as seen in FIG. 2. The pin 190 has fixed adjacent the terminal end thereof, and exteriorly of the support arm 128, a radially extending lever 194 having journaled to the terminal end thereof on a laterally extending support shaft 196 a cam-engaging roller element 198. Secured to the upper end of the lever 194 in any suitable manner is one end of a tension spring 200, the other end of which being fixed to an inwardly extending pin 202 on the inner surface of the support arm 124. Fixed to and projecting angularly from the inner surface of the support arm 124, by means of machine screws 204, is an L-shaped abutment bracket 206 which includes an outwardly projecting leg portion 208 in alignment with and disposed in the path of travel of the lever 194. The bracket 206 includes longitudinally extending slots 210 through which the machine screws 204 extend for adjusting the position of the abutment leg 208 with respect to the lever 194. The tension spring 200 normally urges the support bar 176 and blades 180 thereon in a counterclockwise direction, as viewed in FIGS. 3–6, and the abutment leg 208 orients the blades 180 into substantially coplanar relationship with the blades 168 of the fixed gripper jaw 160.

Fixed on the inner surface of the side plate 48 is a lower camming bar 212 which includes an upper, rearwardly inclined camming edge 214 engageable with the roller element 198 for rotating the lever 194 and blades 180 therewith rearwardly or toward an open position, as seen in FIGS. 5 and 12. The camming edge 214 is disposed in the path of vertical oscillation of the article transport assembly 18 and, as indicated diagrammatically in FIG. 12 and shown in FIG. 5, will be effective to open the gripping means 20 for releasing a carton C at the stripping means 24. However, during upward movement of the article transport assembly 18, the tension spring 200 will be effective to maintain the gripping means 20 closed. It will be observed, during an intermediate portion of travel of the transport assembly 18, the jaws are closed and when the gripping means 20 approaches the upper end of travel of the transport assembly, the jaws will be open to engage the lowermost carton supported in the chute means.

The opening of the gripping means jaw 162 adjacent the upper portion of travel is afforded by a displaceable cam element 216 supported on a lateral pivot axis 218 formed by a suitable pivot pin element extending through the side plate 48. The displaceable cam element 216 has secured thereto, in spaced relation from the pivot axis 218, one end 220 of an upwardly extending tension spring 222 which is secured at its other end 224 on the inner surface of the support plate 48. The support plate 48 has projecting inwardly therefrom and in the pivotal path of the displaceable cam element 216 an abutment pin 226 which limits counterclockwise movement of the displaceable cam element 216, as seen in FIGS. 3–5, which is constantly subject to tension of the spring 222. Additionally, the displaceable cam element 216 includes a forward, substantially vertical camming edge 228 which is disposed in the path of travel of the roller element 198 which opens the displaceable jaw 162 of the gripping means 20. Upward movement of the article transport assembly 18, as shown in FIG. 3, results in the abutment roller 198 engaging the cam edge 228 of the displaceable cam element 216 to cause the jaw 162 to be moved rearwardly away from the fixed jaw 160. When this occurs, the tension of spring 200 is overcome, it being observed that this spring is normally imposing tension on the lever 196 to urge the jaw 162 toward a closed position.

Continued upward movement of the transport assembly 118 to the position shown in FIG. 4 results in the abutment roller 198 engaging on the upper edge 230 of the displaceable cam element 216. When this occurs, the tension spring 200 is of sufficient strength to overcome the tension of spring 222, and the displaceable cam element 216 is moved to the position shown in FIG. 4 for engagement with an abutment block 231 on the inner surface of side wall 48. When the roller 198 moves onto the edge 230 of the displaceable cam element 216, the displaceable jaw 162 will snap into engagement with the side of the cell c opposite that side at which the blade 168 is disposed. When this occurs, the gripping jaws will be firmly set on the lower end of the cells to permit the lowermost carton C to be withdrawn from its tightly nested condition and be transported down toward the stripping means 24. As previously mentioned, as the transport assembly 18 moves downwardly toward the stripping means 24, the abutment roller 198 will engage the lower cam edge 214 and the jaws will be opened to permit removal of the carton being transported, see FIG. 5.

The stripping means 24 comprises a first vertically extending plate 232 having a lower angular foot portion 234 fixed to the support strip or bar 40 by means of suitable fasteners 236. The plate 232 includes a rearwardly extending angular guide portion 238 engageable by the lock flap l of a carton being removed from the nested stack to guide the carton forwardly and downwardly toward the friction wheels of the conveying means 22. The vertical plate 232 is disposed rearwardly of the path of travel of the displaceable blade 266 of the gripping means 20, see FIG. 5, and terminates inwardly of the support arms 122 and 124, as seen in FIG. 2.

Disposed in parallel relationship to the stripper plate 232 is a second vertically extending stripper plate 240 having a lower angular foot portion 242 secured to the support bar 42 by means of suitable fasteners 244. The stripper plate 240 includes a forwardly extending flange or ledge portion 246 which will engage the undersurface of the cell c which is gripped between the jaws 160 and 162. The plates 232 and 234 are so spaced to permit the displaceable jaw 162 to pass downwardly therebetween.

The stripping means 24 includes a third stripper plate 248 including a lower foot portion 250 secured on the support bar 44 by means of suitable fasteners 252. The vertical plate 248 is spaced from the plate 240 to permit the fixed jaw 160 of the gripping means 20 to move therebelow, as seen in FIG. 5, and includes a forwardly and downwardly extending upper plate portion 254 which will receive the lid of a segregated carton thereon. It will be noted that the outer periphery of the friction wheels 108 of the conveying means 22 extend slightly above the upper surface of the plate 254 to engage the outersurface of the lid of a carton being dispensed. Further, the plate 254 continues in a downwardly extending portion 256 which also extends beneath the outer periphery of the friction wheels 108 and 110.

It will be noted, as previously mentioned above, that when the jaws 160, 162 engage the lowermost portion of the lowest carton to be separated, that they are "firmly set" on the lower end of the cells of the carton. As seen in FIG. 5, although the displaceable jaw 162 will pivot away from the jaw 160 prior to the jaws moving beneath or between the plates of the stripper means 24, the sharpened teeth of the jaws may be embedded in the separated carton.

In order to make certain that a separated carton is not retained on the teeth of the jaws 160, 162, these jaws move between the plates 232, 240, and 248 so that the cartons are stripped from the jaw teeth to facilitate ready removal of the cartons by the friction wheels 108 and 110.

Engagement of the lock flap l of a segregated carton provides a slight spring pressure against the angular plate portion 238 when the gripping means 20 is moved downwardly toward the position shown in FIG. 5. This slight spring pressure aids to urge the separated cartons onto the friction wheels 108 and 110 which move the released cartons from the apparatus. It will be recalled that the conveying or friction wheels 108 and 110 are moving at a relatively high speed and accordingly will move the cartons rapidly away from the dispensing apparatus.

The article support assemblies 16 disposed at opposite sides of the vertical path of travel of the nested stack of cartons in the chute means 14 function to support the articles in the chute means, and when the article transport assembly 18 attains the position shown in FIG. 4, these assemblies 16 will have the function of releasing support lip elements from beneath the vertical stack of cartons, and simultaneously applying an inward end pressure at opposite ends of the lowermost cartons of the nested stack to provide a good firm base against which the gripping means will abut in order to insure proper orientation of the gripping jaws 160 and 162. The aforementioned functions of the assemblies 16 are caused to occur in timed relationship to movement of the article transport assembly 18 during the cycle of travel illustrated in FIG. 12.

Referring to FIG. 2, the drive shaft 90 has adjustably secured thereon, by means of a hub portion 258, a radially projecting abutment lever 260. Journaled on the shaft 136 for free rotation with respect to this shaft is a hub or sleeve 262 which includes at one end a radially projecting arm or actuating lever 264 having secured to the terminal end thereof, by means of a transverse shaft 266, an abutment roller 268 disposed in the path of travel of the abutment lever 260. Projecting from the other end of the sleeve 262 is a lever 270, the terminal end 272 of which projects beneath the shaft 90 and has bearing blocks 274 of any suitable material secured thereon for engaging the undersurface of the shaft 90 while the same is rotating. Journaled on a transverse pivot pin 276 forwardly of bearing blocks 274 are the lower ends 278 and 280 of vertically extending connecting rods 282 and 284, respectively, which provide the force transmitting means for the assemblies 16, see FIG. 14. Each of the assemblies 16 is the functional equivalent of the other, and accordingly only one will be described in detail.

The angular relationship of the abutment lever 260 will be adjusted so that the abutment roller 268 is engaged when the gripping means 20 is in the position shown in FIG. 3. Continued rotation of the abutment lever 260 from the position shown in FIG. 3 to that of FIG. 4, indicates the range of rotation in which the abutment lever 260 is effective to cause the lever 264 and connecting links 282 and 284 to be moved downwardly for the purpose of operating and affording the functions mentioned with respect to the assemblies 16.

The assemblies 16 each include a tubular support or bearing sleeve 286 disposed substantially normal to the inclined path of travel defined by the back wall 50 of the chute means 14. The bearing sleeve 286 is mounted on an apertured mounting block 288 secured on the inner surface of the side walls or support plates 46 and 48, as seen in FIG. 1, for example. Extending through and rotatable in the bearing sleeves 286 is a support shaft 290 which has fixed to the rear end thereof, see FIG. 7, a mounting hub 292 of an L-shaped lever 293 which includes an elongated inwardly extending leg 294 and a depending leg 296. The legs 296 of each of the L-shaped levers are terminally apertured and receive opposite ends of an elongated tension spring 300 which tends to urge the elongated legs 294 upwardly and toward the inner surfaces of the side walls 46 and 48. The elongated legs 294 of the L-shaped levers are transversely apertured and receive therethrough a pivot pin or nut and bolt assembly 302 which pivotally engages the apertured upper end of the previously mentioned connecting links or rods 282 and 284. Since the abutment lever 270 includes an elongated terminal end portion extending beneath the drive shaft 90, the tension spring 300 will provide a constant biasing pressure on the short legs or levers 296, but the elongated legs 294 will be normally maintained in a substantially horizontal position, as clearly seen in FIG. 1, for example.

The shaft 290 includes on its forward end 304 spaced mounting sleeve portion 306 of a depending support plate 308 which has mounted on the lower end thereof by means of mounting screws 310 one side flange portion 312 of an L-shaped supporting lip element including an inwardly extending triangular shaped support ledge or lip 314. Suitable shims 315 are provided to adjust for different carton lengths. The apex portion 316 of the support lip 314 will be received between the adjacent rows of cells c beneath the flange f of the lowermost carton in the nested stack of cartons supported in the chute means, see FIG. 10. It will be noted that the flange 312 includes a pair of elongated transverse slots 318 which will permit the L-shaped support lip element to be adjusted for proper orientation with respect to the flanges f of the cartons to be separated and dispensed.

It will be apparent that when the elongated levers 294 are moved downwardly, as indicated by the direction arrow in FIG. 7, caused by the engagement of the abutment lever 260 with the abutment roller 268 on the lever 264, see FIG. 4, the support plate 308 will be moved from the position shown in FIG. 8 to that shown in FIG. 9. This movement is caused by virtue of rotation of the shaft 290 integral with the L-shaped lever 290 including legs 294 and 296 against the force of the tension spring 300. The support lip 314 will move back to the position shown in FIG. 8 after the lowermost carton has been removed from the nested stack of cartons by the article transport assembly 18.

Projecting vertically from the support sleeve 286 is a mounting block 320 which has projecting forwardly therefrom and fixedly secured thereto, in parallel relationship to the shaft 290, a support shaft 322. Fixed on the shaft 322 and retained thereon by means of deformable lock washers 324 in overlying relationship with respect to support plate 308, is a U-shaped, downwardly opening support bracket 326 which has hingedly mounted on a transverse support shaft 328 which extends through depending side flanges thereof, transversely apertured mounting ear portions 330 of a depending friction plate 332 which has a roughened inner surface for engaging the ends of the lowermost nested cartons in the chute means.

The friction plate 332 includes on the outer surface thereof an abutment block element 334 which is engageable on a roller element 336, journaled for free rotation on the support shaft 290. The U-shaped support bracket element 326 includes an outwardly extending, transversely apertured mounted strap 338 which has pivotally connected thereto a depending force transmitting link 340. The mounting sleeve 306 secured to the outer surface of the support plate 308 includes a radially projecting lever portion 342 to which the lower end of the force transmitting link is pivotally connected at 344.

When the shaft 290 is rotated in a clockwise direction, as previously mentioned, the lever 342, through the link 340, which cause the bracket 326 to move upwardly, as shown in FIG. 9. When this occurs, the friction plate 332 will move downwardly and the abutment element 334 will engage the roller 336, causing the plate 332 to move inwardly in frictional gripping relationship with the lowermost nested cartons in the chute means. This function occurs when the support lip 314 moves outwardly to the position shown in FIG. 9 and, at the same time, the gripping means 20, i.e., the fixed and movable jaws 160 and 162, will be in the position shown in FIG. 4 to grippingly engage the lowermost carton C.

As previously mentioned, there is a predetermined time interval during the rotation of the shaft 90 when the abutment lever 260 operatively engages the lever 264 which actuates simultaneous respective inward and outward movement of the friction plate 332 and support plate 308 and support lip 314. During this time interval, the gripping means 20 will have started to move down, and when it moves a sufficient distance, the tension spring 300 will forceably urge the support lips 314 between the upper surface of the lowermost carton which is gripped by the gripping means 20 and the lip 314 will extend beneath the peripheral flange of the next adjacent carton thereabove.

Referring to FIGS. 15–18, an alternate embodiment of an article support assembly is indicated generally at 16′, and is operated by means of the previously described structure causing oscillation of shaft 290. The article gripping means 20 functions in substantially the same manner as previously described, and all of the various cooperating components are identified in these figures by means of similar reference characters previously used.

The article support assemblies 16′ are disposed in the same manner as the article support assemblies 16, previously described, and accordingly only one will be described in detail. The shaft 290 has fixed on the forward end 304 thereof a depending support plate 408. Depending from the support plate 408 and retained on the inner surface thereof by means of nut and bolt assemblies 410 is a resilient plate-like gripping element 411 including a plurality of vertically spaced support lip portions 414 forming therebetween inwardly opening flange-receiving notches 415.

Fixed on the inner surface of the side plates 46, 48, only plate 48 being shown, is an L-shaped abutment bracket 418 which includes an inwardly-directed flange portion 420 having a horizontally adjustable abutment plate 422 which engages the outer surface of the resilient gripping element 411 adjacent the lowermost lip portion 414′.

A vertical stack of nested cartons is normally disposed in the position and condition mentioned with respect to the previously described embodiment. When the gripping means 20, which includes the jaws 160 and 162, engage the lowermost cells c of the cartons disposed in the apparatus, the shaft 290 will rotate clockwise from the position shown in FIG. 16 to that shown in FIG. 17. This movement occurs over the range of rotation caused to the shaft 290 due to engagement of the abutment lever 260 with the actuating lever 264, as previously described. This results in the resilient abutment element 411 assuming an outwardly bent curved shape, as seen in FIG. 17, which permits the stack of cartons to be moved downwardly away from the assembly 16′, it being noted that the assembly 20 prevents the cartons from falling out of the chute means.

Figure 17:
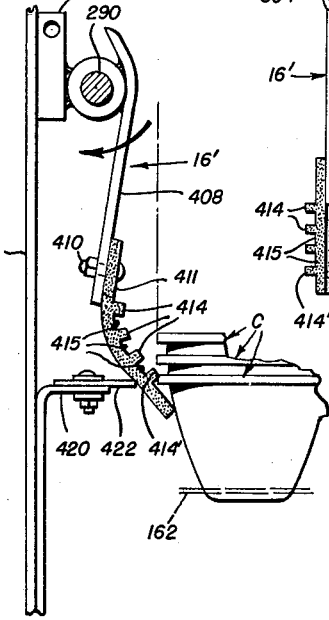
FIG. 17 is a view similar to FIG. 16, showing the position of a carton flange gripping device in the position assumed as a lowermost carton is being removed from a vertical stack of cartons in the apparatus.
Figure 18:
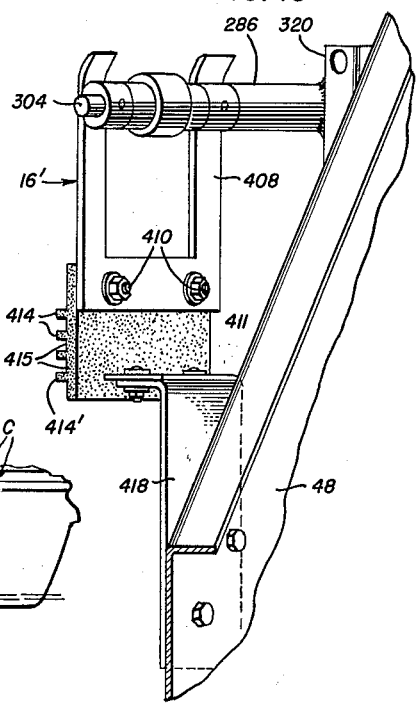
FIG. 18 is a rear elevational view looking substantially from the plane of line 18—18 of FIG. 16, portions being removed and shown in section for purposes of clarity.

The position of the resilient elements 411, shown in FIG. 17, is maintained until the lowermost carton is pulled below the lowermost abutment lip portion 414′. When this occurs, the resilient gripping element 411 will rapidly snap back into the position shown in FIG. 16, and when this occurs, those nested cartons disposed above the lowermost carton being removed will be fixedly maintained in the inclined chute of the apparatus.

Figure 15:
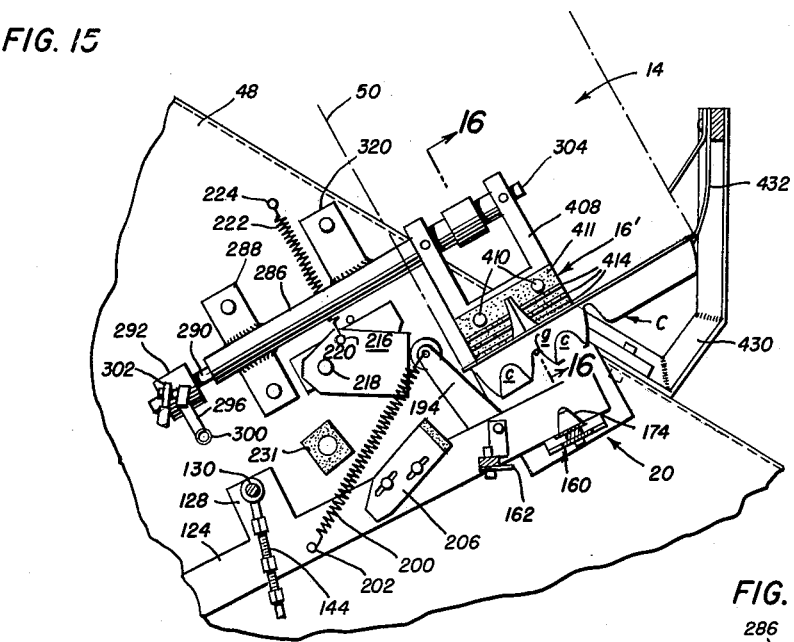
FIG. 15 is a fragmentary vertical section, similar to FIG. 3, showing an alternate embodiment of another article support assembly used in the invention.
Figure 16:
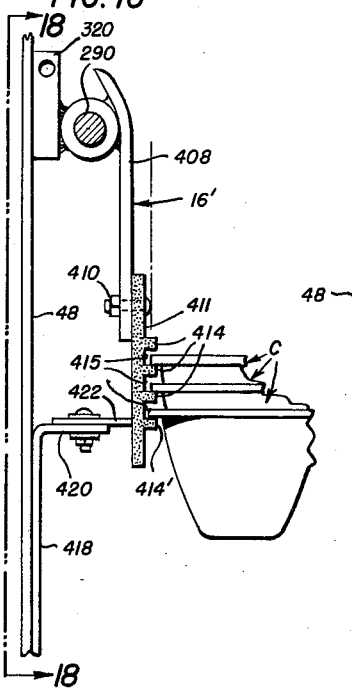
FIG. 16 is an enlarged fragmentary vertical section taken substantially on the plane of line 16—16 of FIG. 15.

If necessary, the apparatus may have extending forwardly from the lower end of the chute means 14 a support frame 430 which will include a transverse bar 432, shown in section in FIG. 15, having a depending, inwardly extending resilient finger 434 which will displaceably engage the lowermost carton cover, as seen in FIG. 15.

Operation

A vertically disposed stack of nested cartons, such as egg cartons, is disposed in the chute means 14 and is supported therein against vertical descent by the article support assemblies 16, i.e., the underlying support lips 314.

The motor 56 is constantly operating; however, the clutch mechanism 62 is disengaged by virtue of the engagement of the actuating lever 68 with the abutment lever 70. The spring 64 tends to urge the clutch and mechanism into engagement. Leftward or rearward movement of actuating lever 80 results in engagement of the clutch mechanism 62 and rotation of the drive gear 66, see FIGS. 11 and 12. The drive gear 66 is permitted to rotate two complete revolutions due to the abutment roller 98 maintaining the lever 80 and abutment lever 70 in the position shown in FIG. 12 during the first complete revolution of the drive gear 66. Counterclockwise rotation of the drive gear 66 causes clockwise rotation of the meshing spur gear 92. This causes rotation of the drive shaft 90 and oscillation of the article transport assembly 18 as illustrated diagrammatically in FIGS. 11 and 12.

The gripping means 20 is moved from an open position adjacent the uppermost portion of its stroke or cycle to a closed intermediate position and back to an open position adjacent the stripping means 24. This function is afforded by the camming edge 214 and displaceable cam element 216 sequentially engaging the roller 198 and causing the displaceable gripping jaw 162 to pivot about the support trunnions or shaft element 190.

The cycle or stroke of the article transport assembly, i.e., rotation of the shaft 90, causes the abutment lever 260 to engage the abutment roller 268 on the lever 264 mounted on the shaft 136. When this engagement occurs, forces transmitted through the connecting links 282, 284 cause outward movement of the support lips 314 and downward and inward movement of the friction plates 332 which retains the lowermost carton in a substantially fixed position to be gripped by the gripping jaws 160, 162. The plates 332 will permit the lowermost carton to be withdrawn from the next adjacent carton upon which the gripping jaws 160, 162 are engaged.

Referring to the embodiment of FIGS. 15–18, the assemblies 16', which include the resilient pads having a plurality of vertically spaced flange engaging lips and grooves receiving the flanges f of the lowermost cartons therein, will function in the same manner as the support assemblies 16 including the inwardly extending support lips 314 and friction plates 332. The lips 414 supporting the flanges f, as previously mentioned, are deformable to permit a lowermost carton to be withdrawn from the bottom of the stack of nested cartons disposed in the inclined chute means. The lower portion of the resilient pads is fixed against outward displacement by the inwardly extending flanges 422 of the angle elements 418. When the shaft 290 from which the support plate 408 carrying the resilient pads 411 rotates clockwise due to engagement of the abutment lever 260 with the lever 264, as previously described, the upper portion of the resilient pad will be urged outwardly. When this occurs, the article transport assembly 18 and the gripping means 20 will be in a position to firmly engage the lowermost carton cells. Downward movement of the gripping means and article transport assembly will result in the stripping off of the lowermost carton and, at the same time, the resilient pads are rapidly urged inwardly to firmly engage those cartons disposed above the lowermost carton.

After the lowermost carton is stripped from the nested stack, and the shaft 290 returns to its normal position, the upper portion of the resilient pads will move inwardly toward the vertical path of travel of the chute means to retain the cartons in the chute means.

It will be obvious to those skilled in the art that various changes may be made without departing from the spirit of the invention and, therefore, the invention is not to be limited to what is shown in the drawings and described in the specification but only as indicated in the appended claims.

What is claimed is:

1. Dispensing apparatus for removing articles one-by-one from the lower portion of a vertical nested stack comprising a support frame, vertically extending chute means defining a vertical path of travel for receiving and through which a vertically disposed stack of nested articles will be dispensed, article support means on said support frame adjacent the lower end of said chute means and including opposed support lip portions projecting laterally into said vertical path of travel and being displaceably mounted for lateral movement with respect to said vertical path of travel, an article transport assembly pivotally mounted for vertical oscillation on said support frame rearwardly of the lower end of said chute means and movable between a position adjacent the lowermost portion of said vertical path of travel and an article-release position therebelow, power means on said support frame, drive means connected to said article transport assembly for oscillating the same in a cycle of vertical oscillation, said article transport means comprising gripping means including a pair of spaced gripping jaws extending transversely beneath said chute means and displaceably supported with respect to each other, means normally biasing said gripping jaws toward a closed position, and means sequentially activating said gripping jaws comprising vertically spaced jaw-operating cam means disposed in the path of travel of said gripping means and engageable with one of said gripping jaws for opening said jaws adjacent the lower end of said chute means to grip a lower article, and subsequently opening said jaws adjacent the lowermost portion of travel thereof for permitting removal of an article from between said jaws.

2. The apparatus as set forth in claim 1 including article stripping means on said support frame below said chute means and intermediately of the path of travel of said article gripping means for aiding to remove an article therefrom as the gripping means moves to its lowermost position, and conveying means forwardly of said stripping means and operatively connected to said power means for engaging and expressing an article deposited on said stripping means.

3. Apparatus as set forth in claim 1 including force transmitting means operatively connected between said power means and said support lip portions for moving said lip portions outwardly with respect to said vertical path of travel when said gripping jaws are in their uppermost position whereby the weight of said stacks of articles is imposed on said transport assembly.

4. Apparatus as set forth in claim 3 in which said lip portions are movable away from said vertical path of travel, and pressure means extendable into said path of travel simultaneously as said lip portions are moved therefrom for applying end pressure on the lowermost articles in said nested stack when the gripping means of said article transport assembly is disposed adjacent the lower end of said chute means.

5. Apparatus as set forth in claim 1 wherein said lip portions are oscillatable laterally away from said vertical path of travel, pressure means extendable into said vertical path of travel adjacent the lower end of said chute means as said lip portions are moved laterally therefrom, and drive means between said power means, lip portions and pressure means for simultaneously operating the same.

6. Apparatus as set forth in claim 1, wherein said lip portions comprise deformable abutment elements projecting toward each other into said vertical path of travel.

7. Apparatus as set forth in claim 6, wherein said deformable elements include a plurality of vertically spaced lip portions for abuttingly engaging overlying edge portions of the flanges of the lowermost nested articles in said chute means, and mechanically actuated force-transmitting means synchronized in movement with respect to said article transport assembly and said article gripping means and connected to said deformable elements for displacing an upper portion of said deformable elements inwardly and outwardly with respect to said vertical path of travel to permit additional articles to move the lowermost position in said chute means and to permit articles to be removed therefrom.

8. Dispensing apparatus for a vertical stack of nested articles to be dispensed one-by-one comprising a support frame, vertically extending chute means defining a vertical path of travel for a vertically disposed stack of nested articles, said chute means terminating intermediately of said support frame, a pair of opposed article support means adjacent the lower end of said chute means and including mechanically-operated, laterally-displaceable lip portions movable relative to said vertical path of travel of said chute means, a vertically oscillatable article transport assembly pivotally mounted on said support frame rearwardly and beneath the lower end of said chute means, said article transport assembly including a pair of elongated, parallel article-gripping jaws extending transversely beneath the lower end of said chute means, at least one of said gripping jaws being displaceable with respect to the other for grippingly and releasably engaging the lowermost article in said chute means, article stripping means on said support frame beneath the lower end of said chute means and intermediately of the path of travel of said gripping jaws for receiving said gripping jaws therebeneath, mechanically operated conveying means forwardly of said stripping means for frictionally engaging and expressing an article stripped away from said stripping means, and power means on said support frame operatively connected to said mechanically-operated lip portions, said article transport assembly and said conveying means for operating the same.

9. The structure as set forth in claim 8 wherein said article transport assembly comprises a pair of elongated arms disposed inwardly of said support frame, said gripping jaws being mounted on said support arms, said one gripping jaw being pivotally mounted on said arms and including an actuating lever extending radially from the pivotal support thereof, and vertically spaced cam means on said support frame sequentially engageable with said actuating arm for moving said pivotal jaw with respect to said other jaw during the upper and lower extreme positions of travel of said article transport means.

10. The structure of claim 9 wherein said mechanically-operated, laterally-displaceable lip portions include depending plate-elements mounted on an axis of oscilation adjacent opposite sides of said chute means, said power means comprising a driven shaft connected to vertically reciprocable link portions operatively connected to said support arms, a drive shaft disposed parallel to said driven shaft and drivingly connected thereto, levers operatively connected to said plate-elements, spring means extending between said levers for urging the plate-elements into said vertical path of travel, and a radial projecting abutment lever on said driving shaft periodically displacing said last mentioned levers for periodically operating said plate-elements.

11. The structure of claim 10 in which said plate-elements have mounted thereon pressure plates oscillatable into said vertical path of travel, and force transmitting links connected between said plate elements and pressure plate for moving the pressure plate downwardly and inwardly into said vertical path of travel as said plate-elements are moved outwardly therefrom.

References Cited in the file of this patent

UNITED STATES PATENTS

| | | |
|---|---|---|
| 637,316 | Woodland | Nov. 21, 1899 |
| 1,093,976 | Claussen | Apr. 21, 1914 |
| 1,472,584 | Carle | Oct. 30, 1923 |
| 1,722,048 | Hill | July 23, 1929 |
| 1,990,148 | Tevander | Feb. 5, 1935 |
| 2,325,164 | Goodwin | July 27, 1943 |
| 2,655,272 | McClure et al. | Oct. 13, 1953 |
| 2,954,900 | Brubaker | Oct. 4, 1960 |

OTHER REFERENCES

Germany (application) 1,034,011, printed July 10, 1958, Kl. 54f 2/30.